(12) United States Patent
Sarkar (10) Patent No.: US 6,846,588 B2
(45) Date of Patent: Jan. 25, 2005

(54) HOLLOW INORGANIC MEMBRANES PRODUCED BY METAL OR COMPOSITE ELECTRODEPOSITION

(75) Inventor: Partho Sarkar, Edmonton (CA)

(73) Assignee: Alberta Research Council Inc., Edmonton (CA)

( * ) Notice: Subject to any disclaimer, the term of this patent is extended or adjusted under 35 U.S.C. 154(b) by 173 days.

(21) Appl. No.: 10/053,241

(22) Filed: Jan. 16, 2002

(65) Prior Publication Data

US 2003/0134176 A1 Jul. 17, 2003

(51) Int. Cl.[7] .................. H01M 4/86; H01M 4/88; H01M 8/12; B05D 5/12; C04B 35/64
(52) U.S. Cl. .................. 429/31; 429/45; 264/618; 264/632; 427/115; 502/101
(58) Field of Search ............ 429/31, 45; 264/618, 264/632; 427/115; 502/101

(56) References Cited

U.S. PATENT DOCUMENTS

| | | | |
|---|---|---|---|
| 3,707,234 A | 12/1972 | Salemi | |
| 4,454,207 A | 6/1984 | Fraioli et al. ............ | 429/17 |
| 4,490,444 A | 12/1984 | Isenberg ............ | 429/31 |
| 4,567,117 A | 1/1986 | Patel et al. ............ | 429/19 |
| 4,728,584 A | 3/1988 | Isenberg ............ | 429/31 |
| 4,729,931 A | 3/1988 | Grimble ............ | 429/17 |
| 4,791,035 A | 12/1988 | Reichner ............ | 429/31 |
| 5,002,647 A | 3/1991 | Tanabe et al. ............ | 204/181.1 |
| 5,077,148 A | 12/1991 | Schora et al. ............ | 429/16 |
| 5,103,871 A | 4/1992 | Misawa et al. ............ | 138/48 |
| 5,169,731 A | 12/1992 | Yoshimura et al. | |
| 5,190,834 A | * 3/1993 | Kendall ............ | 429/31 |
| 5,244,752 A | 9/1993 | Zymboly ............ | 429/31 |
| 5,273,837 A | 12/1993 | Aitken et al. ............ | 429/30 |

(List continued on next page.)

FOREIGN PATENT DOCUMENTS

| | | | | |
|---|---|---|---|---|
| DE | 3922673 | | 1/1991 | ............ H01M/8/12 |
| DE | 199 57 641 | | 1/2001 | |
| EP | 0 424 673 | A1 | 5/1991 | |
| EP | 0 451 971 | | 10/1991 | |
| EP | 0678597 | A1 | 10/1995 | ............ C25D/13/02 |
| EP | 0713931 | A2 | 5/1996 | ............ C25D/13/02 |
| EP | 0 896 378 | | 2/1999 | |
| JP | 4-248272 | | 9/1992 | |
| JP | 04-237964 | | 1/1993 | |
| JP | 9-283161 | * | 10/1997 | ............ H01M/8/12 |
| JP | 10158894 | | 6/1998 | ............ C25D/13/02 |
| JP | 11-226370 | | 11/1999 | |
| WO | WO 99/17390 | | 4/1999 | ............ H01M/8/12 |
| WO | WO 01/28011 | A1 | 4/2001 | ............ H01M/4/62 |
| WO | WO 01 86030 | A1 | 11/2001 | |
| WO | 01/86030 | | 11/2001 | |

Primary Examiner—Stephen J. Kalafut
(74) Attorney, Agent, or Firm—Knobbe, Martens, Olson & Bear LLP (57) ABSTRACT

This invention relates to a method of producing a hollow inorganic membrane that is particularly suitable for solid oxide fuel cell applications, as well as producing hollow inorganic composite laminated membranes having at least one such hollow inorganic membrane. The method comprises electrodepositing an inorganic material that includes at least some electrically conductive metal and some ionically conductive ceramic onto an electrically conductive combustible core, drying the core bearing the deposited inorganic material, then, sintering the core bearing the deposited inorganic material such that the core combusts, thereby producing a hollow inorganic membrane. The method may further comprises electrophoretically depositing a ceramic composition onto the hollow inorganic membrane, to produce an assembly of hollow inorganic composite laminated membranes.

45 Claims, 6 Drawing Sheets

U.S. PATENT DOCUMENTS

| | | | |
|---|---|---|---|
| 5,302,319 A | 4/1994 | Wright et al. | 252/314 |
| 5,342,704 A | 8/1994 | Vasilow et al. | 429/31 |
| 5,380,600 A | 1/1995 | Hansen et al. | 429/17 |
| 5,385,700 A * | 1/1995 | Denton | 264/618 X |
| 5,458,989 A | 10/1995 | Dodge | 429/31 |
| 5,518,827 A | 5/1996 | Matsumura et al. | 429/19 |
| 5,693,230 A | 12/1997 | Asher | |
| 5,763,114 A | 6/1998 | Khandkar et al. | 429/20 |
| 5,807,642 A | 9/1998 | Xue et al. | 429/33 |
| 5,827,620 A | 10/1998 | Kendall | 429/31 |
| 5,895,573 A | 4/1999 | Scharstuhl | |
| 5,908,713 A | 6/1999 | Ruka et al. | 429/31 |
| 5,935,727 A | 8/1999 | Chiao | 429/32 |
| 5,942,348 A | 8/1999 | Jansing et al. | 429/32 |
| 5,952,116 A | 9/1999 | Blum et al. | 429/26 |
| 5,976,721 A | 11/1999 | Limaye | 429/13 |
| 5,993,985 A | 11/1999 | Borglum | 429/31 |
| 5,993,989 A | 11/1999 | Baozhen et al. | 429/41 |
| 6,001,501 A | 12/1999 | Collie | 429/31 |
| 6,007,932 A | 12/1999 | Steyn | 429/31 |
| 6,017,646 A | 1/2000 | Prasad et al. | 429/13 |
| 6,051,173 A | 4/2000 | Fasano et al. | 264/44 |
| 6,051,330 A | 4/2000 | Fasano et al. | 429/30 |
| 6,074,771 A | 6/2000 | Cubukcu et al. | 429/30 |
| 6,093,297 A | 7/2000 | Tomura et al. | |
| 6,099,985 A | 8/2000 | Elangovan et al. | 429/44 |
| 6,183,897 B1 | 2/2001 | Hartvigsen et al. | 429/32 |
| 6,207,311 B1 | 3/2001 | Baozhen et al. | 429/31 |
| 6,214,490 B1 | 4/2001 | Pate | 429/94 |
| 6,217,822 B1 | 4/2001 | Borglum | 264/632 |
| 6,238,819 B1 | 5/2001 | Cahill et al. | 429/162 |
| 6,290,756 B1 | 9/2001 | Macheras et al. | |
| 6,312,847 B1 | 11/2001 | Tsukuda et al. | 429/31 |
| 6,436,565 B1 * | 8/2002 | Song et al. | 429/31 |
| 2002/0028367 A1 * | 3/2002 | Sammes et al. | 429/31 |
| 2003/0134169 A1 | 7/2003 | Sarkar et al. | |
| 2003/0134170 A1 | 7/2003 | Sarkar et al. | |
| 2003/0134171 A1 * | 7/2003 | Sarkar et al. | 429/31 |

* cited by examiner

HOLLOW INORGANIC MEMBRANES PRODUCED BY METAL OR COMPOSITE ELECTRODEPOSITION

FIELD OF THE INVENTION

This invention relates generally to the production of hollow inorganic membranes produced by metal or composite electrodeposition, and in particular to hollow inorganic laminated composite membranes produced by such methods and that are particularly useful in solid oxide fuel cell applications.

BACKGROUND OF THE INVENTION

It is well known to deposit coatings of material on a conductive core by electrophoretic deposition (EPD). EPD is a combination of electrophoresis and deposition. Electrophoresis is the movement of charged particles in an electric field. Deposition is the coagulation of particles into a mass. Applicant's own PCT application no. PCT/CA01/00634 relates generally to the production of hollow ceramic membranes by EPD, and in particular to the production of hollow ceramic electrodes by EPD for solid oxide fuel cells (SOFC).

In general, a SOFC comprises two electrodes (anode and cathode) separated by a ceramic, solid-phase electrolyte. To achieve adequate ionic conductivity in such a ceramic electrolyte, the SOFC operates at an elevated temperature, typically in the order of about 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction:

Cathode reaction:

Known SOFC designs include planar and tubular fuel cells. Applicant's own PCT application no. PCT/CA01/00634 discloses a method of producing a tubular electrode supported electrochemical fuel cell by (a) electrophoretically depositing an anodic or cathodic material onto a fibre core to create a porous electrode layer;
(b) depositing a solid electrolyte layer onto the electrode layer;
(c) drying and sintering the core bearing the deposited material or cathode layer and the solid electrolyte layer at a temperature and for a length of time sufficient to combust the fibre core and to create a fully dense electrolyte layer while maintaining the porosity of the inner electrode layer;
(d) depositing an outer electrode layer onto the solid electrolyte layer, which is of an anodic material if the inner layer comprises a cathodic material, or a cathodic material if the inner layer comprises a anodic material;
(e) sintering the end product at a temperature and for a length of time sufficient to bond the outer layer to the solid electrolyte layer while maintaining the porosity of the outer and inner electrode layers.

In the completed fuel cell, the inner electrode may be the anode, and the outer electrode may be the cathode. In such case, fuel may be supplied to the anode by passing through the tube, and air may be supplied to the cathode by passing over the outer surface of the tube.

While this PCT application discloses producing tubular ceramic fuel cells by EPD, it may be desirable to produce hollow inorganic membranes having characteristics that are different than the hollow ceramic membranes produced by EPD as described in this PCT application. For example, it may be desirable to produce a hollow inorganic membrane having a different shape, composition, ductility, fracture toughness, and/or microstructure than a ceramic membrane produced by EPD, wherein such characteristics are particularly suitable for certain fuel cell applications.

SUMMARY OF THE INVENTION

According to one aspect of the invention, there is provided a method of producing a porous hollow inorganic electrode for a solid oxide fuel cell. The method comprises (a) depositing electrode material onto an electrically conductive combustible core, the electrode material including electrically conductive metal, ionically conductive ceramic particles, and combustible particles, wherein at least the metal is deposited by electrodeposition;
(b) drying the core bearing the deposited electrode material; then,
(c) sintering the core bearing the deposited electrode material such that the core and combustible particles combust, thereby producing a porous hollow inorganic electrode.

The ceramic particles may be co-deposited with the metal on the core by electrodeposition to form a single-layered electrode. Or, the metal and some combustible particles may first be electrodeposited on the core to form a metal layer, then the ceramic particles and some combustible particles are deposited onto the metal layer by one of electrodeposition or electrophoretic deposition, thereby forming a dual-layered electrode.

Instead of or in addition to adding combustible particles to the electrode material, the method may further comprise prior to deposition, applying a masking material onto the combustible core, and after deposition, removing the masking material, thereby leaving an electrode structure that has openings that correspond to the masked areas; these openings allow the passage of reactant through the electrode.

The core may be made of a flexible material, such that after electrodepositing and before sintering, the electrode can be manipulated into a suitable electrode shape. The shapes may include one or a combination of shapes from the group of U-shaped, serpentine-shaped, or coiled shaped.

The metal of the electrode may be chosen from the group of nickel, copper, palladium, chromium, platinum, gold silver and/or their alloys. The core may be chose from the group of a carbon fibre, a carbon fibre bundle, a carbon tow, or a carbon rod. The combustible particles may be chosen from the group consisting of carbon, carbon black, and organic and polymeric compounds.

The porosity of the electrode may be controlled by one or more of controlling the duration and temperature of the sintering step, controlling the particle size, size distribution and/or surface area of the combustible particles, controlling the thickness of the electrode, or controlling the sintering atmosphere.

According to another aspect of the invention, there is provided a method of producing a hollow solid oxide fuel cell that includes the method of producing the electrode as described above. After the electrode has dried, and before it is sintered, a ceramic electrolyte membrane is attached to the outside surface of the electrode by electrophoretically depositing ceramic particles onto the electrode. These ceramic particles may be yittria-stabilized zirconia.

After the electrolyte layer has been attached to the electrode (inner electrode) and has dried, an outer electrode layer is attached to the outer surface of the electrolyte. The electrophoretic deposition step may be repeated before sintering to form the outer electrode layer on the electrolyte. The ceramic particulate material for the outer electrode may be different or have different characteristics than the electrolyte. For example, the outer particulate material may include combustible particles, that create a porous outer electrode after sintering. If the composition of the ceramic material of the electrolyte and outer electrode are the same, one or more of the particle size, distribution, surface area, microstructure and porosity can be different.

According to yet another aspect of the invention, a method of producing a hollow inorganic membrane is provided. The method comprises (a) electrodepositing an inorganic material that includes electrically conductive metal onto an electrically conductive combustible core;

(b) drying the core bearing the deposited inorganic material; then, (c) sintering the core bearing the deposited inorganic material such that the core combusts, thereby producing a hollow inorganic metal-containing membrane.

The inorganic material may also include ceramic particles that are co-deposited with the metal on the core by electrodeposition, thereby producing a hollow inorganic cermet membrane. The material may also include combustible particles, such that upon sintering the membrane the combustible particles also comubst, thereby producing a hollow porous inorganic membrane. Such a membrane may be useful in fluid separation applications.

After electrodepositing and before sintering, ceramic particles may be electrophoretically deposited onto the metallic membrane, thereby forming a multi-membrane hollow structure having an inner metal-containing membrane, and an outer ceramic membrane. Such an outer ceramic membrane may be useful as a support structure for a thin inner metallic membrane used in gas separation applications.

Combustible particles may be electrophoretically co-deposited with the ceramic particles onto the metallic membrane. Then, the multi-membrane structure may be sintered so that the electrophoretically deposited combustible particles can also combust, thereby producing a multi-membrane structure having a porous inner and outer membrane.

The core may be of a flexible material, and the method may further comprising after electrodepositing and before sintering, manipulating the membrane into a desired shape. The electrode may be manipulated into one or a combination of shapes from the group of U-shaped, serpentine-shaped, or coiled shaped. The metal may be chosen from the group of nickel, copper, palladium, chromium, platinum, gold silver and/or their alloys. An inner membrane made of thin palladium layer may be particularly useful in hydrogen gas separation applications. The ceramic particles may be from the group of be yittria-stabilized zirconia. The core may be chosen from the group of a carbon fibre, a carbon fibre bundle, a carbon tow, or a carbon rod. The combustible particles may be chosen from the group consisting of carbon, carbon black, and organic and polymeric compounds.

The membrane porosity may be controlled by one or more of controlling the duration and temperature of the sintering step, controlling the sintering atmosphere, controlling the particle size, size distribution and/or surface area of the combustable particles, or controlling the thickness of the membrane.

According to yet another aspect of the invention, a hollow inorganic multi-layered membrane apparatus, and a hollow solid oxide fuel cell may be produced by one or more of the above methods.

DETAILED DESCRIPTION OF DRAWINGS

FIG. 1 is a flowchart of the steps for producing an inner electrode of a tubular SOFC; in particular, FIG. 1($a$) illustrates the production of a dual-layered electrode structure, and FIG. 1($b$) illustrates the production of a single-layered electrode structure.

FIGS. 6($a$) and 6($b$) are schematic illustrations of forming openings in a fuel cell electrode by applying masking strips over a conductive core.

DETAILED DESCRIPTION

When describing the present invention, the following terms have the following meanings, unless indicated otherwise. All terms not defined herein have their common art-recognized meanings.

The term "fibre" or "filament" refers to a single strand of fibrous material; "fibre tow" or "fibre bundle" shall refer to a multi-filament yarn or an array of fibres; and "fibre core" shall refer to a fibre, filament, fibre tow or fibre bundle. In all cases, the fibre core is electrically conductive or treated to be electrically conductive to allow its use as an electrode.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and nonoxide compounds including but not limited to carbides (such as of titanium tungsten, boron, silicon), silicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, and ceramic solid ionic conductors (such as yittria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

The term "hollow inorganic membrane (HIM)" refers to a tubular body comprising an inorganic material. The cross-sectional geometry may be any shape such as circular, square, rectangular, triangular, and polygonal. The longitudinal geometry of the tubular body may be any shape such as elongate, serpentine, and coiled. The membrane may be porous or non-porous. The inorganic material includes metal, cermet composite, and ceramic.

The term "hollow inorganic composite laminated membranes (HICLM)" refers to an assembly of multiple concentric contacting layers of hollow inorganic membranes, wherein one or more membrane layers may have different material compositions.

The term "porous" in the context of hollow ceramic, metal, and cermet membranes means that the ceramic material contains pores (voids). Therefore, the density of the porous membrane material is lower than that of the theoretical density of the material. The voids in the porous membranes can be connected (i.e., channel type) or disconnected (i.e. isolated). In a porous hollow membrane, the majority of the pores are connected. To be considered porous as used herein in reference to membranes, a membrane should have a density which is at most about 95% of the theoretical density of the material. The amount of porosity can be determined by measuring the bulk density of the porous body and from the theoretical density of the materials in the porous body. Pore size and its distribution in a porous body can be measured by mercury or non-mercury porosimeters, BET or microstructural image analysis as is well known in the art.

At present there is no known facile commercial technique to fabricate a HIM or HICLM having an inner diameter and wall thickness in the range of a few micrometers to a few millimeters, and being readily manipulated into a selected shape. According to one aspect of the invention, there is provided a method of producing a HIM made of either metal or cermet, wherein the metal membrane is produced by metal electrodeposition (MED) on a flexible conductive core, and the cermet membrane by composite electrodeposition (CED) also on a flexible conductive core, and wherein the HIM produced by either method is ductile enough to be manipulated into a suitable shape. The present invention also provides a method of producing a HICLM having at least one of the HIMs produced according to above aspect of the invention. For example, a HICLM for SOFC applications may have a porous inner HIM that serves as an electrode, a non-porous middle HIM that serves as an electrolyte, and a porous outer membrane that serves as an electrode, wherein the inner HIM is manufactured by one or more of MED and CED.

The specific embodiments described here relate particularly to HIMs and HICLMs for use in fuel cell applications. However, it is to be understood that the invention is not limited to fuel cell applications, and that it is evident to a person skilled in the art how to produce HIM and HICLM for non-fuel cell applications based on the described embodiments.

According to one embodiment of the invention, there is provided a method of manufacturing a HICLM for use as a solid oxide fuel cell (SOFC). The SOFC has three membranes: an inner electrode membrane, a middle electrolyte membrane, and an outer electrode membrane. The electrodes serve as a current collector and a catalyst. The electrolyte allows oxygen ions to pass from one electrode (cathode) to the other (anode), and is impermeable to nitrogen in air and fuel gas flows on either side of the electrolyte.

Figure 1A:
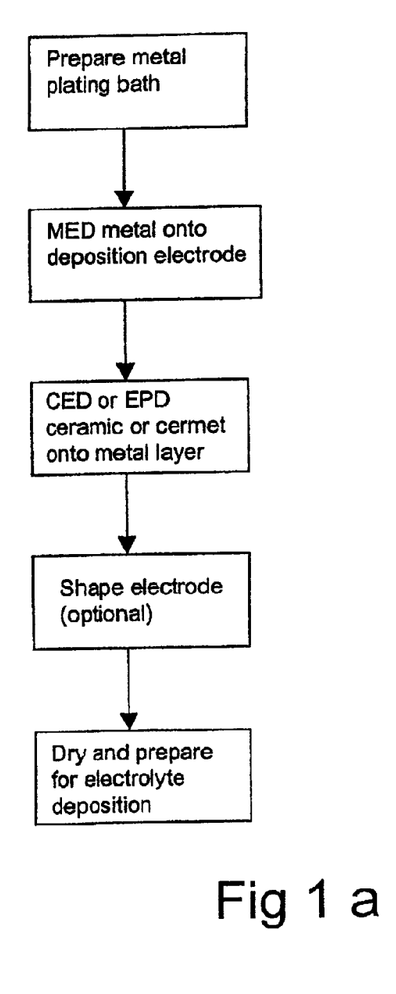
Figure 1B:
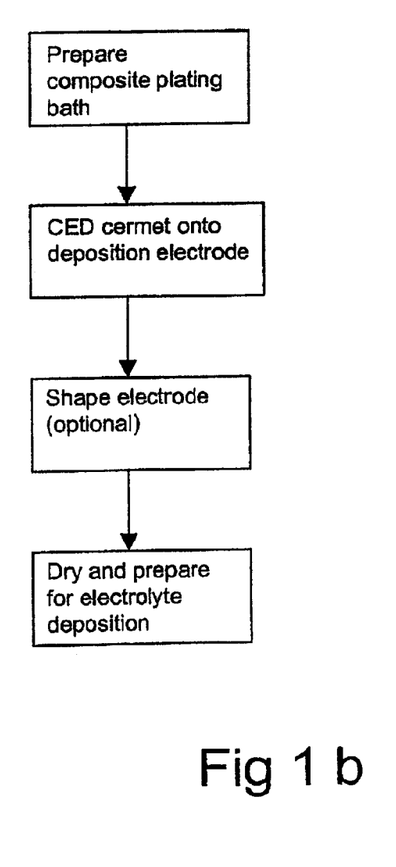
Figure 2:
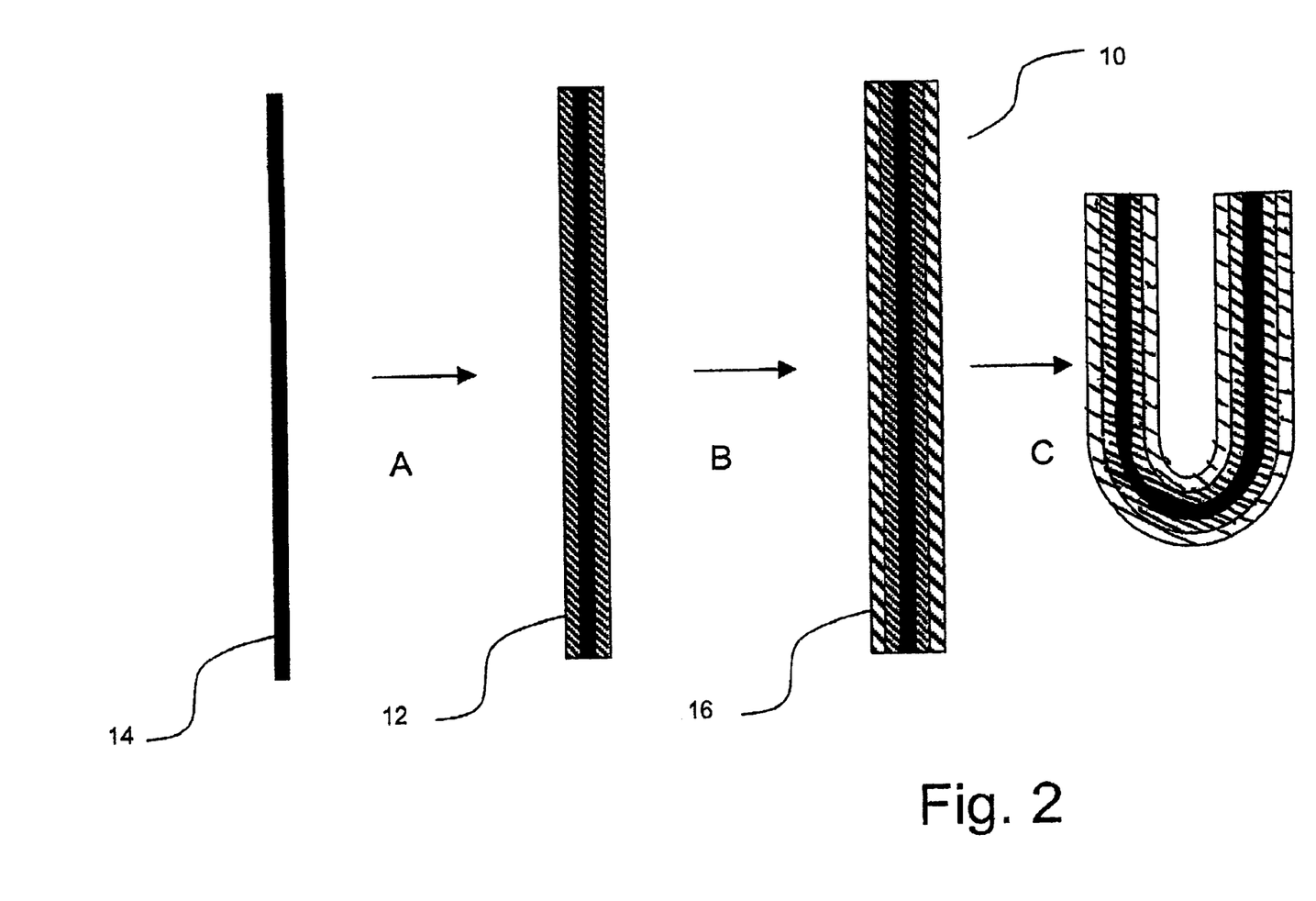
FIG. 2 is a schematic illustration of the method of producing a dual-layered electrode as shown in the flowchart of FIG. 1($a$).
Figure 3:
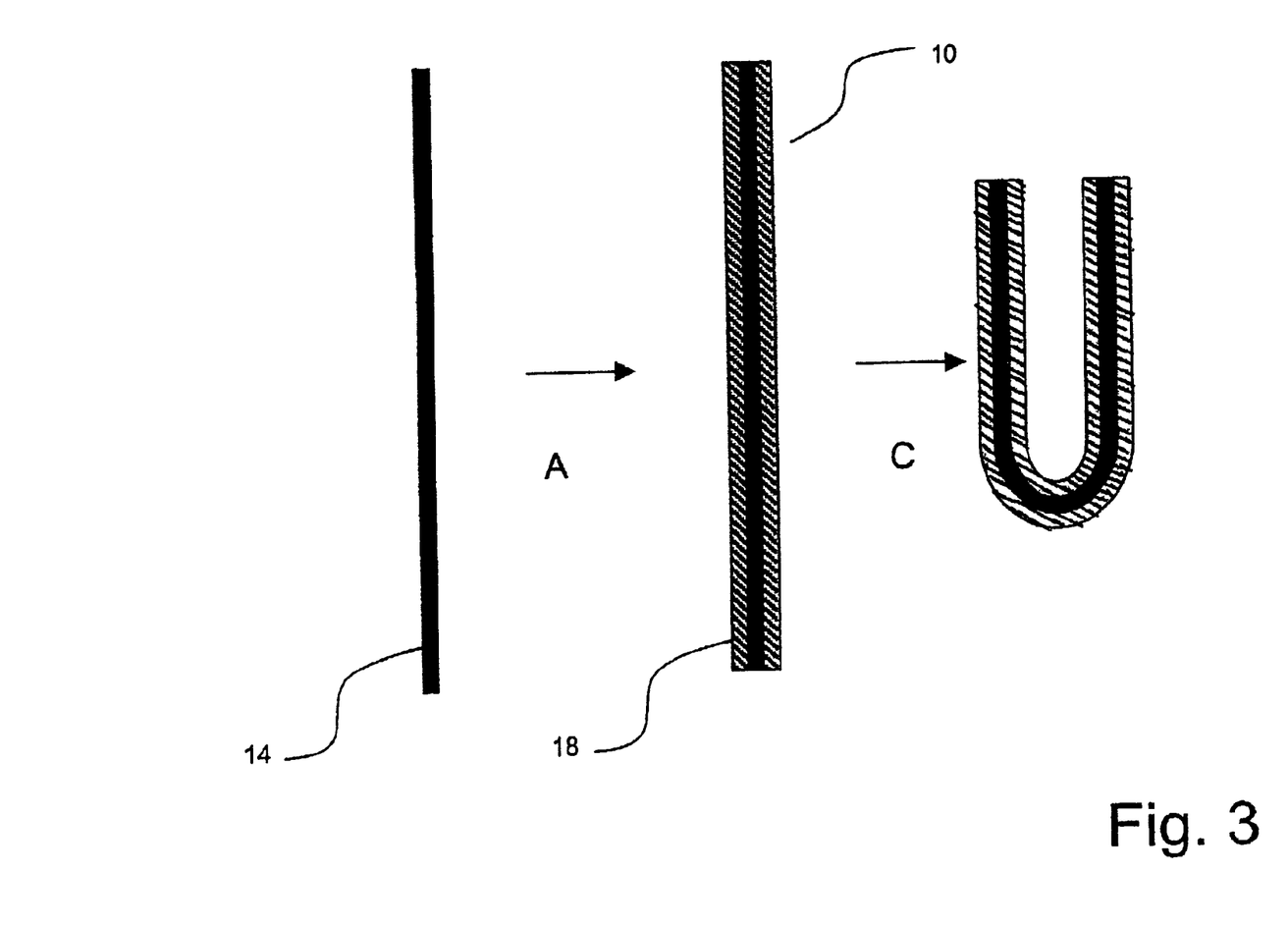
FIG. 3 is a schematic illustration of the method of producing a single-layered electrode structure as shown in the flowchart of FIG. 1($b$).

Referring to FIGS. 1–3, the first stage in producing the SOFC is to produce an inner electrode 10. The inner electrode 10 may be produced as a two-layered structure (FIGS. 1(a) and 2) or a single-layered structure (FIGS. 1(b) and 3). In a two-layered structure, an electrically conductive metal layer 12 is first deposited by metal electrodeposition (MED) onto a conductive core 14. Then, an ionically conductive ceramic-containing layer 16 is deposited over the metal layer 12 by electrophoretic deposition (EPD), or by composite electrodeposition (CED). In a single layered structure, the anode 10 is formed by depositing an electrically and ionically conductive cermet layer 18 onto the conductive core 14 by CED.

MED is a process of depositing a metal onto a conductive core by electrolysis. The conductive core is commonly referred to as an "electrode" in the electrodeposition art. To distinguish from an electrode structure formed by MED or CED of material on the conductive core, the conductive core electrode 10 will herein be referred to as the "deposition electrode". The MED process requires two deposition electrodes 14 (anode and cathode), an electrolyte bath (i.e. metal salt solution), and a source of electrons. The electrons "e" may be supplied by an external DC current source that is connected via an external circuit to the deposition anode and cathode. Upon application of current, metal ions $M^{n-} \rightarrow M^{n+}$ travel through the bath from the deposition anode and deposit on the deposition cathode, and electrons travel via the circuit from the deposition anode to the deposition cathode.

An MED apparatus (not shown) is provided for carrying out the MED process. The apparatus includes a container for holding a metal salt solution, a deposition anode in the container having a metal to be deposited, a deposition cathode in the container for receiving the deposited metal, an external DC electric current source, and, an external circuit electrically connected to the deposition anode, the deposition cathode, and the external current source.

The inner electrode 10 may serve as anode or cathode; in this embodiment, the inner electrode 10 is the anode. In producing the two-layered anode structure, a suitable anode metal is deposited by MED on the deposition cathode 14 (step A in FIG. 2); such suitable metal may be nickel. Other suitable metals include copper, palladium, chromium, platinum, gold, silver and/or their alloys. When serving as a cathode, the inner electrode 10 preferably comprises one of platinum, gold, silver and/or their alloys. The metal salt solution may suitably be Krohn Bright Nickel Electrolyte Solution by Krohn Technical Products, Carlstadt N.J. 07072. Nickel is a particularly suitable choice for use in the anode, as it is relatively cheap, is effective as an electron conductor and as a catalyst for the anode, and helps to break down natural gas fuel into hydrogen atoms and carbon monoxide. However, as nickel is not particularly effective in conducting oxygen ions (conducted through the electrolyte to the anode), an ionically conductive ceramic-containing material is then deposited onto the nickel layer (step B in FIG. 2). For example, a layer of nickel/zirconium oxide cermet may be deposited over the nickel layer by CED or EPD, to form a dual-layered anode structure. Preferably, the cermet layer is deposited by CED, as the cermet tends to adhere to the core in a way that allows for easy manipulation. In contrast it has been found that cermet deposited by EPD tends to break or flake away from the core if manipulated; in such case, the core bearing the metal layer may be manipulated prior to the deposition of cermet by EPD. Preferably, the dual-layered anode structure has a thickness of between 1 $\mu$m to 200 $\mu$m.

The CED process is similar to the MED process except that the electrolyte bath contains ceramic particles in addition to metal. The aforementioned Krohn plating solution may also serve as a suitable such electrolyte bath. During CED, metal and ceramic particles deposit simultaneously forming a cermet coating. Cermet particles are deposited on a deposition cathode on application of a DC electric field (continuous or pulse DC field) from an external current source. The cermet membrane has electron and ion conductive and catalytic properties.

Referring specifically to FIGS. 1b and 3, the anode 10 may comprise a single layer 18 that is both electrically and ionically conductive. Such a layer 18 may be formed by CED of cermet particles directly on the deposition electrode 14 (step A in FIG. 3).

In both MED and CED, the electrode 10 can be made porous by adding to the electrolyte bath combustable additives such as carbon, carbon black, graphite powder, corn starch, and rice starch. As discussed in more detail below, a sintering process is applied to the electrode 10 that causes the combustible materials to burn away, leaving behind pores in the electrode 10.

Figure 6A:
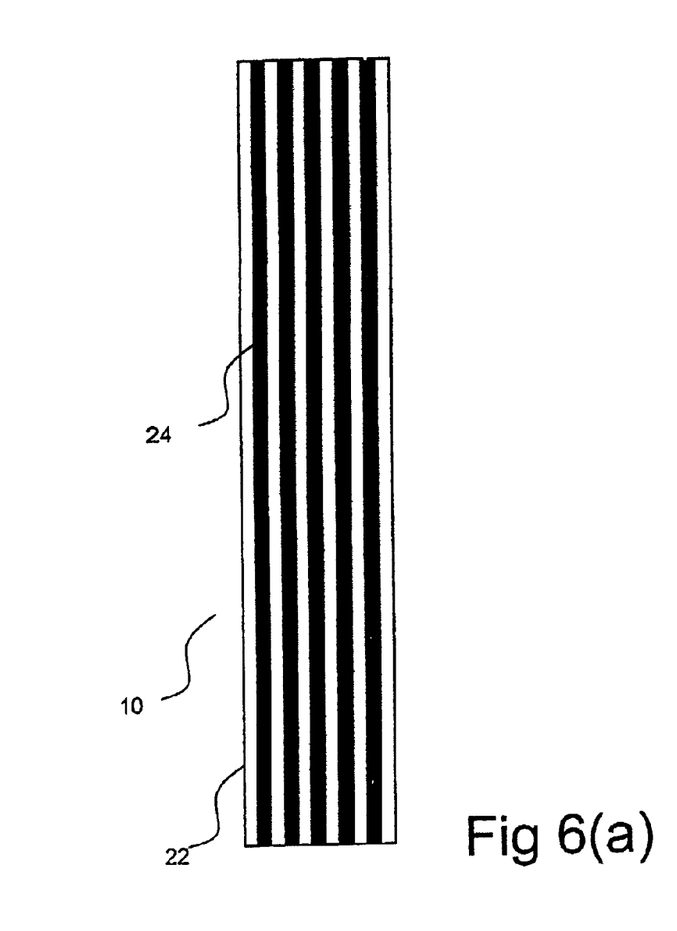
Figure 6B:
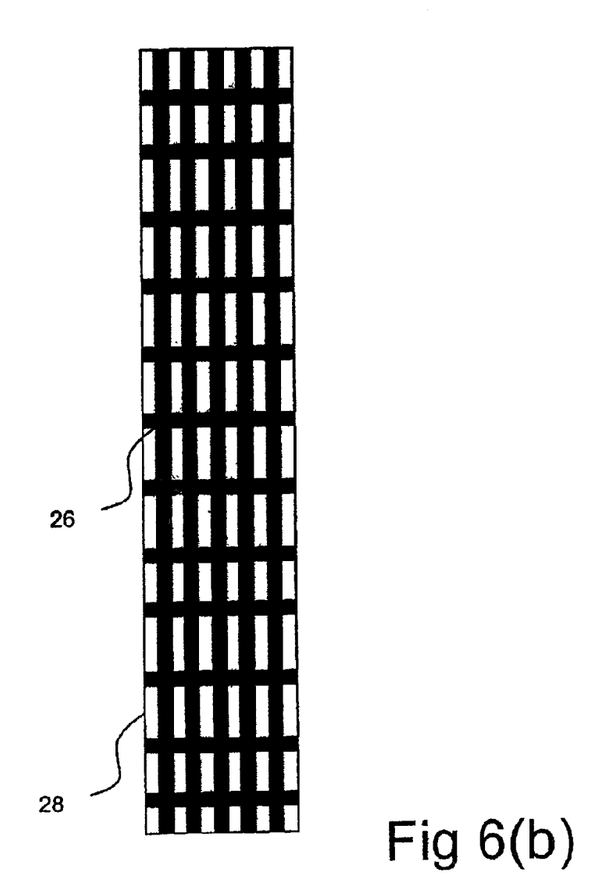

Preferably, the anode 10 is porous and is deposited around the deposition electrode 14 such that it completely surrounds the deposition electrode 14. However, according to an alternative embodiment of the invention and referring to FIGS. 6(a) and 6(b), non-conductive masking material 20 may be placed on the deposition electrode prior to MED, such that when the anode materials are deposited, they are deposited only on the portions of the deposition electrode 14 not covered by the masking material 20. After the masking material 20 is removed, an anode 10 is formed having openings 22 (where the masking material used to be) that allow access of reactant to the electrolyte. The masking material 20 may be in the form of spaced parallel strips 24. Or, the masking material 20 may take the form of a rectangular mesh 26; after the mesh 26 is removed, an anode 10 is formed having a pattern of rectangles 28 corresponding to the openings of the mesh 26. It is evident that the masking material 20 may be arranged in a number of other shapes. For example, the strips 24 may comprise a plurality of squares (not shown) such that when the strips are removed, an anode is formed having a mesh-like pattern.

Referring to FIGS. 2 and 3, the electrode 10 can be formed on a number of different combustable, electrically conductive cores including a carbon fibre 14 or carbon tow (not shown) or a carbon rod (not shown). The carbon fibre 14 may have a diameter of approximately 5 microns or less and may be suitable to produce very fine HIMs. At the other end of the range, fibre tow having a diameter of about 5 or 6 mm may be used to produce larger HIMs. At the larger end of the range, rods having a desired diameter may be used in place of fibre tow 10. As well, the rods may have any suitable cross-sectional configuration.

Fibre tow may be used either treated with a polymeric binder or untreated. A treated fibre core will produce a ceramic tube having substantially a single hole. A fibre core made from untreated fibre tow may result in a tube having a plurality of holes in a porous core. The fibre tow may be treated by briefly dipping the tow into a solution of an organic or polymeric binder. In one example, a solution of nitrocellulose in acetone is suitable. The nitrocellulose forms a very thin coating on the tow and seals the interfilamentous gaps. The binder should preferably be insoluble in the EPD medium. Nitrocellulose is a preferred binder because it is insoluble in ethanol, which is a preferred EPD medium.

If the intrafilamentous gaps are unsealed, as in untreated fibre tow, the deposited particles may infiltrate the tow during the deposition process, resulting in the porous core referred to above. The porous core may be preferred in some applications in which a high internal surface area may be beneficial. Examples of such application include high surface area catalyst supports or membrane reactors.

Referring again to FIGS. 1–3, after deposition of electrode material, the electrode 10 is disconnected from the electroplating apparatus external circuit and removed from the electrolyte bath. Then, if desired, it is manipulated into a suitable shape (step C in FIGS. 2 and 3). Both nickel and cermet layers are ductile (provided the cermet was deposited by CED), and enable the electrode to be manipulated into a number of complex shapes without cracking. Also, carbon fibre and untreated fibre tow are flexible and can be manipulated into various shapes without breaking. If the fibre tow is treated with an organic binder, the manipulation should be made before the binder dries, since after drying, the binder will harden and become inflexible. If the binder does dry before manipulation, a solvent can be applied to the binder to soften it. If instead a polymer binder is used, manipulation may be made even after drying, as the polymer binder has a glass transition temperature ($T_g$) lower than room temperature and does not tend to harden after drying. Alternatively, a thermoplastic binder may be used, which hardens after drying, but can be made flexible by application of heat.

The electrode 10 can be manipulated into shapes that are particularly suitable for its intended application. For example, in SOFC applications, it is desirable to maximize the active surface area of the fuel cell in a given volume. Shapes that provide a high surface area per volume include coiled or serpentine shapes (see FIG. 5). Also, a fuel cell that has its reactant inlet and outlets at the same end may be advantageous: because a SOFC system operates at a very high temperature, the fuel cells must be effectively thermally insulated from other components in the system, and thus may be located inside a thermally insulated enclosure. It may be desirable to reduce the number of openings in the thermally insulated enclosure in order to reduce the complexity of the system design, and in this connection, the fuel cells can be shaped so that the inlets and outlets of the fuel cell pass through the same opening in the thermally insulated enclosure. In this connection, the electrode may be bent into a "U" shape so that a U-shaped fuel cell can be produced. Furthermore, a coiled or serpentine shaped fuel cell may also be formed such that the reactant inlets and outlets are at the same end.

Figure 4:
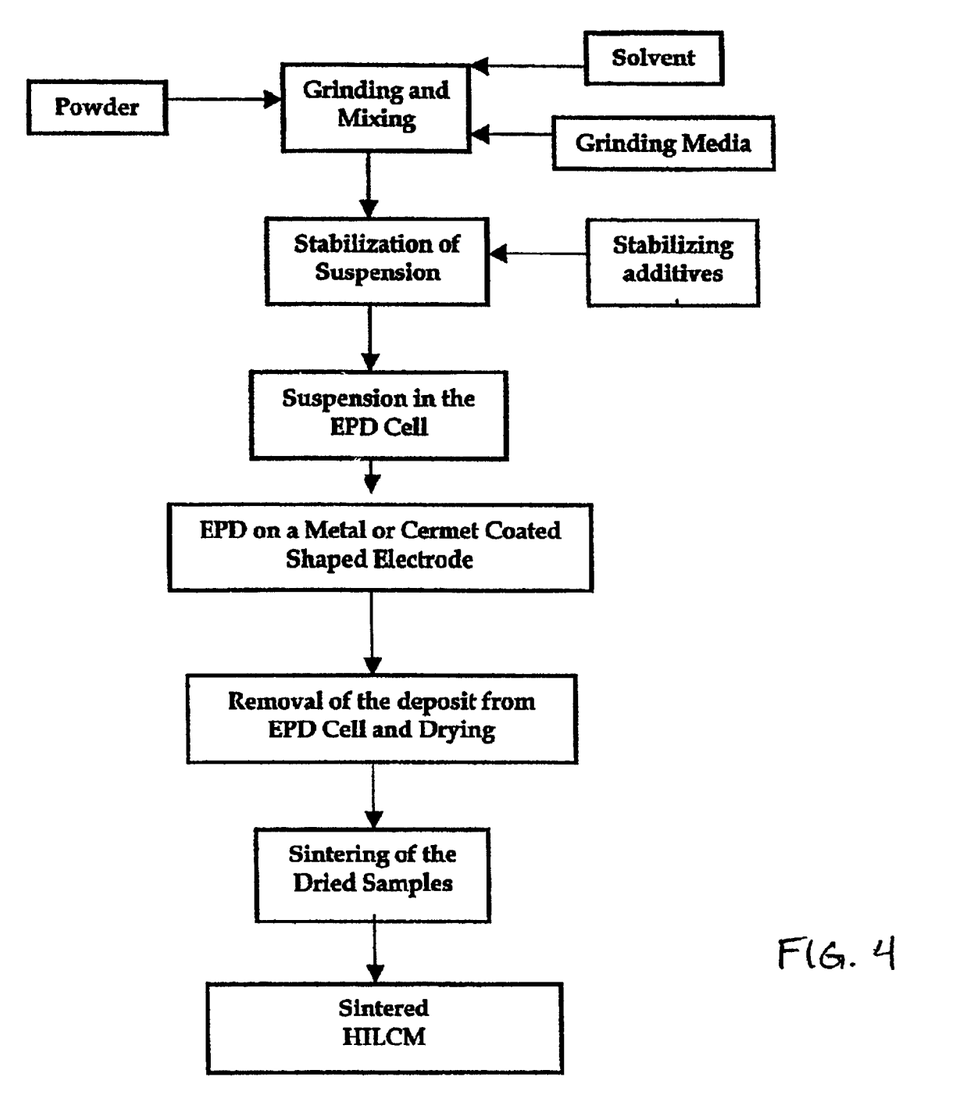
FIG. 4 is a flowchart of a method of producing an electrolyte by EPD on the electrode of FIGS. 1($a$) or 1($b$).
Figure 5:
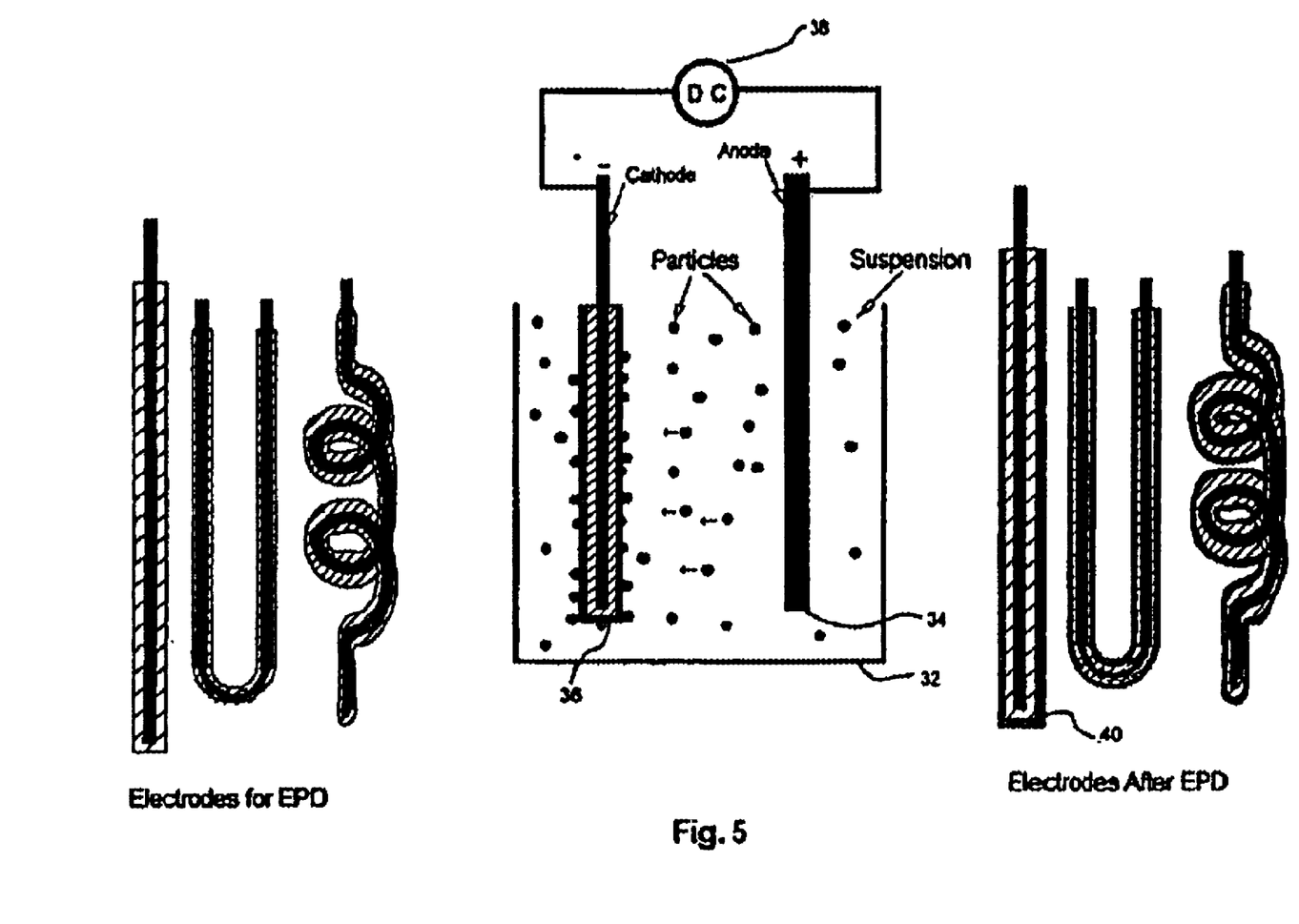
FIG. 5 is a schematic illustration of an EPD apparatus used to produce the electrolyte shown in FIG. 4.

Referring now to FIGS. 4 and 5, after the electrode 10 has been manipulated (if desired) into a desired shape, the electrode 10 is washed with water to rinse off any electrolyte bath solution, and dried (either at ambient or at an elevated temperature). Then, a ceramic electrolyte layer 30 is deposited by EPD onto the outside surface of the electrode 10. EPD generally speaking is a process whereby particles are deposited from a colloid suspension onto a conductive core (deposition electrode) of an opposite charge, upon application of an external DC electrical field. The particles include metals, glass, ceramics, polymers or carbon. The application of the electric field causes the migration of particles toward a specific deposition electrode. Particles in a colloid are known to develop a surface charge relative to the suspension medium, which may be dependent on the pH of the suspension medium. For example, alumina has a positive charge at a pH of below about 7. In the formation of ceramic green bodies by EPD, the ceramic particles may be positively or negatively charged; in case of positively charged particles they are deposited on the deposition cathode; in case of negatively charged particles, they are deposited on the deposition anode. It is not essential for the deposition process that the particles have to reach the oppositely charged deposition electrode; particles can be deposited around a deposition electrode onto a semi-permeable membrane which allow ions to pass but not the particles themselves.

Referring to FIG. 4, the EPD process is used to deposit a ceramic electrolyte layer 30 onto the electrode 10 according to the following steps:

(a) prepare a EPD suspension comprising a selected ratio of ceramic powder, solvent and grinding media, by grinding and mixing these materials together until the average particle size reaches an appropriate size range. In one embodiment the particle size range may range from 150 nm to about 10,000 nm. The particles should preferably be no larger than 15,000 nm. More preferably, the particle size range may be between 200 nm to 1000 nm. As will be appreciated by those skilled in the art, larger particle sizes may result in the ceramic membrane having greater porosity than a ceramic membrane having a smaller particle size in identical sintering conditions (e.g. temperature, time, atmosphere);

(b) Add additional solvent to get the desired concentration; the solvent may a non-aqueous organic fluid such as ethanol, isopropanol, butanol, butylamine, acetylacetone, methyl ethyl ketone, acetone, methanol, absolute alcohol or mixtures thereof; suitable concentrations include 0.25 vol % to 30 vol % of particles in the suspension;

(c) Add additives to stabilize the suspension, e.g. acetic acid;

(d) Transfer the suspension to an EPD cell as shown in FIG. 5; the EPD cell includes container 32, a deposition anode 34, a deposition cathode 36 and an external DC electrical source 38;

(e) Place the electrode 10 in the suspension, and electrically connect it to the deposition anode 34; when so connected, the electrode 10 serves as the deposition cathode in the EPD process;

(f) Turn on the DC electrical source 38 to activate the EPD process; continue until the electrode 10 is coated with ceramic material 30 of a desired thickness between the range of 1 $\mu$m to 1000 $\mu$m;

(g) Disconnect and remove the electrolyte/electrode assembly 40 from the circuit, and remove it from the EPD cell; and, (h) Dry the electrolyte/electrode assembly 40 in preparation for sintering; drying may take place at room temperature or at a slightly elevated temperature.

After the electrolyte/electrode assembly 40 has dried, it is sintered at a temperature sufficient to burn out the combustible conductive core 14 as well as any combustible additives in the membranes. The sintering also enables the electrolyte 30 to achieve full density while maintaining the porosity of the inner electrode 10. The sintering cycle for a zirconia deposit where the sintering atmosphere is air may begin by raising the temperature to about 500° C. to about 900° C. at a heating rate of between 20° C./hr to 300° C./hr and preferably over a period of about 6 hours to about 9 hours and held that temperature for about 3 hours. The temperature may then be raised at a rate of about 100° C. to about 300° C. per hour to the sintering temperature of about 1300° C. to about 1500° C. and held there for about 1 to about 5 hours. The temperature may then be lowered at a rate of about 100° C. to about 300° C. per hour to room temperature.

It has been found that some samples of straight electrolyte/electrode assemblies 40 bend or warp during sintering; it is theorized that the bending is caused by asymmetrical heating. For example, it was observed that samples laid on a plate during sintering experienced bending/warping; it was found that the heat input from the bottom of the plate was different from the other directions. It was found that keeping the samples vertical and applying uniform heat to the samples avoided the bending/warping phenomena. It was also found that samples may be sintered in a horizontal position without bending/warping if the plate upon which the samples were laid was covered with a coarse powder which is non-reactive with the samples, and is non-sintering at the sample sintering temperature. The powder serves to distribute the heat evenly in all directions to the sample that is placed in the powder-containing plate. A suitable such powder for zirconia-based samples is coarse zirconia (if the powder completely sinters during the sample sintering temperature, it is difficult to recover the sample from the powder; however, a powder that partially sinters may be acceptable if the powder can be readily broken away from the sample after sintering).

After the electrolyte layer 30 has been deposited onto the inner electrode 10, an outer electrode layer (not shown) is formed by any suitable means, including but not restricted to EPDing electrode material onto the electrolyte 30, or dip-coating, brushing, spraying or sol-gel coating the electrolyte 30 in a electrode slurry (not shown). If the outer electrode is to serve as the cathode, the slurry may suitably be composed of LSM (or a Mg-doped lanthanum manganate), binder, and solvent and combustible particles. The outer electrode composition may suitably be LSM, or a LSM/zirconia mixture, or another electrically and ionically conductive ceramic material.

Then, the outer electrode is subjected to a drying stage wherein the electrode is subjected to heat at increasing temperatures of 40° C., 60° C., 80° C., 100° C., 120° C., and 140° C. The outer electrode may be heated at each temperature for a period between 10 minutes to 5 hours. Then, a final sintering stage is applied to partially density the outer electrode layer, to bond the outer electrode layer to the electrolyte 40, and to combust any combustible particles in the outer electrode material. The sintering cycle where the sintering atmosphere is air may begin by raising the temperature from room temperature to a first temperature of about 200–250° C., then to a second temperature between about 400–600° C., then to a third temperature between about 800–900° C., then finally to a temperature of between 1200 to 1300° C. The heating rate for each of these sintering steps is between about 20–200° C./hr. The electrode is held at each of these temperatures for between about 15 minutes to 5 hours. The temperature may then be lowered at a rate of about 60–300° C. per hour to room temperature.

Various characteristics of the inner electrode and electrolyte assembly 40 can be controlled. For example, the inner electrode diameter can be selected by selecting a particular diameter of the core. The ductility of the inner electrode can be controlled by controlling the amount of additives (generally, the greater the amount of second phase additives, the less ductile the electrode).

Porosity of the electrodes 10, can be controlled by controlling the quantity and type of combustible particles added to the ceramic particle suspension. For example, combustible particles can include carbon black, carbon, graphite, different polymer powders and cellulose base powders. As a result of the addition, the combustible particles are co-deposited onto the conductive core during MED or CED. When the electrodes are heated during sintering, the combustible particles are burned off (along with the core), leaving a porous hollow structure.

The porosity can also be controlled by controlling the temperature and time of the sintering process. Long sintering times or sintering at higher temperatures or a combination of both can reduce porosity. Porosity can also be controlled by controlling the ceramic particle size distribution and its surface area. Finer and high surface area ceramic particles normally will have a lower porosity than coarse and low surface area powder when both of them are sintered under identical conditions. Porosity can also be controlled by sintering additives which are well known in the art, such as glassy or sol-get phase or any other liquid forming phases. The time and temperature parameters in a typical sintering cycle, may be varied by one skilled in the art to achieve a particular desired result.

According to another embodiment of the invention, a tubular SOFC is produced according the steps in the above method along with an additional sintering step that occurs after the inner electrode is deposited on the conductive core, but before the electrolyte is deposited onto the inner electrode. In other words, a method of producing a tubular SOFC is provided having three sintering cycles. In the first cycle, and after the inner electrode is formed, the core bearing the inner electrode is subjected to the first sintering cycle, wherein the temperature is raised from room temperature to about 500 C. at a heating rate of about 30–100° C./hr and held at that temperature for between about 10 minutes to 3 hours. Then the temperature is raised at a rate of about 60–200° C./hr to 900° C. then held at that temperature for between about 15 min to 3 hours. Finally, the temperature is raised at a rate of between about 100–300° C./ hr to 1100–1300 C. and held there for between about 1 to 5 hours. During this sintering stage, the combustible core and combustible particles (if any) combust, leaving behind a hollow (and porous if combustible particles in the electrode material are present) electrode structure . Then, the electrode is cooled at a rate of 100–300° C./hr to room temperature. Then, zirconia electrolyte is deposited onto the electrode by EPD or by vacuum casting, and the electrode/electrolyte structure is subjected to the second sintering cycle. In this cycle, the structure is heated from room temp to 900° C. at a rate of between about 60–200° C./hr, then without holding at that temperature to between about 1300–1500° C. (preferably at 1400° C.) at a rate of between about 200–300° C./hr and held at that temperature for between about 1–5 hours. Then, the structure is cooled at 300° C. per hour to room temperature. Then, ceramic material is applied onto the electrolyte to form the outer electrode by painting, dip coating etc. and the fuel cell structure is subjected to the third sintering cycle. In this cycle, the structure is heated from room temperature to a first temperature of about 200–250° C., then to a second temperature between about 400–600° C., then to a third temperature between about 800–900° C., then finally to a temperature of between 1200 to 1300° C. The heating rate for each of these sintering steps is between about 20–200° C./hr. The electrode is sintered at each of these temperatures for between about 15 minutes to 5 hours. The temperature may then be lowered at a rate of about 60–300° C. per hour to room temperature.

In addition to fuel cell applications, HIM or HICLM structures according to the invention have other applications, including:

Liquid Separation: In this case, a HICLM is provided having a metal (or cermet) inner membrane and a ceramic outer membrane in adjacent contact. Both metal (or cermet) and ceramic membranes are porous, i.e. there are pores extending through the radial (thickness) dimension of the membrane. The porosity of each membrane can be selected depending on the type of separation required; smaller pores may be required to separate liquids having smaller molecular sizes from other liquids or solids. This HICLM is suitable for fresh water treatment, waste water treatment, waste oil treatment, gas separation, and biotechnology/pharmaceutical-related purification and concentration applications.

Gas Separation: In this case, a HICLM is provided having a thin non-porous Pd or Pd-alloy metal (or cermet) inner membrane, and a porous ceramic outer membrane. This HICLM is useful for hydrogen gas separation applications since hydrogen gas is diffusible through the Pd or Pd-alloy. The Pd or Pd-alloy inner membrane is kept thin to minimize costs and reduce hydrogen diffusion time; the outer membrane thus acts as a support substrate for the metal membrane. Alternatively, the HICLM may be provided with a porous Pd or Pd-alloy metal (or cermet) inner membrane and a dense ceramic outer membrane that is non-porous, and that is an ionic or mixed conductor. In this embodiment, the metal layer serves as an electrode and catalyst. The properties of the electrolyte are selected so that the electrolyte is impermeable to certain gases, but will allow certain ions to pass therethrough. For example, if the ceramic is made from stabilized zirconia, the HICLM can separate oxygen from air by separating oxygen molecules into electrons and oxygen ions at the inner membrane upon application of electric current from an external DC source, then pass the oxygen ions through the electrolyte, for recombining with the electrons that have traveled from the inner membrane to the outside surface of the electrolyte through an external circuit.

While the preferred embodiment of the invention has been illustrated and described, it will be appreciated that various changes can be made therein without departing from the scope and spirit of the invention.

What is claimed is:

1. A method of producing a hollow inorganic electrode for a solid oxide fuel cell, comprising:
   (a) depositing electrode material onto an electrically conductive combustible core, the electrode material including electrically conductive metal, and ionically conductive ceramic particles, wherein at least the metal is deposited by electrodeposition;
   (b) drying the core bearing the deposited electrode material; then,
   (c) sintering the core bearing the deposited electrode material such that the core combusts, thereby producing a hollow electrode.

2. The method of claim 1 wherein the ceramic particles are co-deposited with the metal on the core by composite electrodeposition, thereby forming a single-layered electrode.

3. The method of claim 1 wherein the metal is first deposited on the core by metal electrodeposition to form a metal layer, then the ceramic particles are deposited onto the metal layer by electrophoretic deposition, thereby producing a dual-layered electrode.

4. The method of claim 1 wherein the electrode material includes combustible particles that are deposited onto the conductive core by electrodeposition, and are combusted during sintering, thereby producing a porous electrode.

5. The method of claim 1 further comprising prior to deposition, applying masking material onto the combustible core, and after deposition, removing the masking material thereby leaving an electrode structure having openings corresponding to the masked areas, the openings being for the passage of reactant through the electrode.

6. The method of claim 1 wherein the core is of a flexible material, and further comprising after electrodepositing and before sintering, manipulating the electrode into a suitable electrode shape.

7. The method of claim 6 wherein the electrode is manipulated into one or a combination of shapes from the group of U-shaped, serpentine-shaped, or coiled shaped.

8. The method of claim 1 wherein the electrode is an anode and the metal is one in the group of nickel, copper, palladium, chromium, platinum, gold silver and/or their alloys.

9. The method of claim 1 further comprising after drying and before sintering, attaching a ceramic electrolyte to the outside surface of the electrode by electrophoretically depositing ceramic particles onto the electrode.

10. The method of claim 9 wherein the ceramic electrolyte particles are yttria-stabilized zirconia.

11. The method of claim 1 wherein the core is one of the group of a carbon fibre, a carbon fibre bundle, a carbon tow, or a carbon rod.

12. The method of claim 4 wherein the porosity of the electrode is controlled by one or more of controlling the duration and temperature of the sintering step, controlling the particle size, size distribution and/or surface area of the combustible particles, controlling the thickness of the electrode, or controlling the sintering atmosphere.

13. The method of claim 4 wherein the combustible particles are chosen from the group consisting of carbon, carbon black, and organic and polymeric compounds.

14. The method of claim 10 wherein the electrophoretic deposition step is repeated before sintering to form an outer electrode on the electrolyte, the ceramic material for the outer electrode being electrically and ionically conductive.

15. The method of claim 14 wherein the composition of the ceramic material of the electrolyte and outer electrode are the same, but one or more of the particle size, distribution, surface area, microstructure and porosity are different.

16. The method of claim 3 wherein some of the metal is first deposited on the core by metal electrodeposition to form a metal layer, then some of the metal and the ceramic particles are deposited onto the metal layer by one of composite electrodeposition or electrophoretic deposition, thereby producing a dual-layered electrode.

17. A method of producing a hollow solid oxide fuel cell comprising
(a) producing an inner electrode by depositing inner electrode material onto an electrically conductive combustible core, the inner electrode material including electrically conductive metal, and ionically conductive ceramic particles, wherein at least the metal is deposited by electrodeposition;
(b) producing a ceramic electrolyte by electrophoretically depositing a ceramic material onto the outside surface of the inner electrode;
(c) drying the inner electrode and electrolyte;
(d) sintering the inner electrode and electrolyte under conditions sufficient to combust the core;
(e) producing an outer electrode by attaching outer electrode material onto the outside surface of the electrolyte, the outer electrode material including electrically and ionically conductive ceramic particles and combustible particles; and,
(f) sintering the inner electrode, electrolyte, and outer electrode under conditions sufficient to combust the combustible particles,
thereby producing a hollow fuel cell structure having a porous outer electrode.

18. The method of claim 17 further comprising between steps (a) and (b), sintering the core-bearing the inner electrode under conditions sufficient to combust the core.

19. The method of claim 17 wherein the metal is first deposited on the core by metal electrodeposition to form a metal layer, then the ceramic particles are deposited onto the metal layer by electrophoretic deposition, thereby producing a dual-layered electrode.

20. The method of claim 17 wherein some of the metal is first deposited on the core by metal electrodeposition to form a metal layer, then some of the metal and the ceramic particles are deposited onto the metal layer by one of composite electrodeposition or electrophoretic deposition, thereby producing a dual-layered electrode.

21. A method of producing a hollow inorganic membrane, comprising:
(a) electrodepositing an inorganic material that includes electrically conductive metal onto an electrically conductive combustible core;
(b) drying the core bearing the deposited inorganic material; then,
(c) sintering the core bearing the deposited inorganic material such that the core combusts, thereby producing a hollow inorganic metal-containing membrane.

22. The method of claim 21 wherein the material also includes ceramic particles that are co-deposited with the metal on the core by electrodeposition, thereby producing a hollow inorganic cermet membrane.

23. The method of claim 21 wherein the material also includes combustible particles, and sintering the membrane also combusts the combustible particles, thereby producing a hollow porous inorganic membrane.

24. The method of claim 21 further comprising after electrodepositing and before sintering, electrophoretically depositing ceramic particles onto the metal-containing membrane, thereby forming a multi-membrane hollow structure having an inner metal-containing membrane, and an outer ceramic membrane.

25. The method of claim 24 wherein combustible particles are electrophoretically co-deposited with the ceramic particles onto the metal-containing membrane, and sintering the multi-membrane structure also combusts the electrophoretically deposited combustible particles, thereby producing a multi-membrane structure having a porous inner and outer membrane.

26. The method of claim 21 wherein the core is of a flexible material, and further comprising after electrodepositing and before sintering, manipulating the membrane into a desired shape.

27. The method of claim 26 wherein the electrode is manipulated into one or a combination of shapes from the group of U-shaped, serpentine-shaped, or coiled shaped.

28. The method of claim 21 wherein the metal is one in the group of nickel, copper, palladium, chromium, platinum, gold silver and/or their alloys.

29. The method of claim 21 wherein the ceramic particles are yittria-stabilized zirconia.

30. The method of claim 21 wherein the core is one of the group of a carbon fibre, a carbon fibre bundle, a carbon tow, or a carbon rod.

31. The method of claim 23 wherein the porosity of each membrane is controlled by one or more of controlling the duration and temperature of the sintering step, controlling the sintering atmosphere, controlling the particle size, size distribution and/or surface area of the combustible particles, or controlling the thickness of the membrane.

32. The method of claim 23 wherein the combustible particles are chosen from the group consisting of carbon, carbon black; and organic and polymeric compounds.

33. A hollow solid oxide fuel cell comprising:
   (a) an electrodeposition-formed inner electrode having a composition that includes an electrically conductive metal material and an ionically conductive ceramic material;
   (b) a non-porous electrolyte electrophoretically deposited on the inner electrode and having a composition that includes an ionically conductive ceramic material; and,
   (c) an outer electrode attached to the outer surface of the electrolyte and having a composition that includes an electrically and ionically conductive ceramic material.

34. The fuel cell of claim 33 having one or a combination of a U-shape, serpentine shape, or helical shape.

35. The fuel cell of claim 33 wherein the metal material of the inner electrode is one in the group of nickel, copper, palladium, chromium, platinum, gold silver and/or their alloys.

36. The fuel cell of claim 33 wherein the ceramic material of the electrolyte is yittria-stabilized zirconia.

37. The fuel cell of claim 33 wherein the ceramic material of the outer electrode is lanthanum strontium manganate.

38. A hollow inorganic multi-layered membrane apparatus comprising:
   (a) a hollow electrodeposition-formed inner membrane having a composition that includes a metal material; and,
   (b) an outer membrane electrophoretically deposited on the inner membrane and having a composition that includes a ceramic material.

39. The apparatus of claim 38 having one or a combination of a U-shape, serpentine shape, or helical shape.

40. The apparatus of claim 38 wherein the metal material of the inner membrane is one in the group of nickel, copper, palladium, chromium, platinum, gold silver and/or their alloys.

41. The apparatus of claim 38 wherein the ceramic material of the outer membrane is yittria-stabilized zirconia.

42. The fuel cell of claim 33 wherein the inner electrode comprises a single cermet layer of the metal and ceramic materials.

43. The fuel cell of claim 33 wherein the ceramic material of the inner electrode is also electronically conductive and the inner electrode comprises an inner metal layer and an outer ceramic layer attached to the outside of the inner metal layer.

44. The fuel cell of claim 33 wherein the inner electrode comprises an inner metal layer and an outer cermet layer attached to the outside of the inner metal layer.

45. A hollow solid oxide fuel cell comprising:
   (a) an electrodeposition-formed inner electrode having a composition that includes an electrically conductive metal material and an ionically conductive ceramic material, and having a layer with a plurality of spaced reactant openings extending through the layer;
   (b) a non-porous electrolyte electrophoretically deposited on the inner electrode and having a composition that includes an ionically conductive ceramic material; and
   (c) an outer electrode attached to the outer surface of the electrolyte and having a composition that includes an electrically and ionically conductive ceramic material.

* * * * *

UNITED STATES PATENT AND TRADEMARK OFFICE
CERTIFICATE OF CORRECTION

PATENT NO. : 6,846,588 B2  Page 1 of 1
DATED : January 25, 2005
INVENTOR(S) : Partho Sarkar and Hongsang Rho It is certified that error appears in the above-identified patent and that said Letters Patent is hereby corrected as shown below:

<u>Title page,</u>
Item [75], Inventors, should read -- Inventor: Partho Sarkar, Edmonton (CA) and Hongsang Rho, Edmonton (CA) --

Signed and Sealed this

Seventeenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,846,588 B2
APPLICATION NO. : 10/053241
DATED : January 25, 2005
INVENTOR(S) : Partho Sarkar and Hongsang Rho It is certified that error appears in the above-identified patent and that said Letters Patent is hereby corrected as shown below:

Col. 15, Ln 14,
In Claim 32, after "black" delete ";" and insert --,--, therefore Col. 15, Ln 30,
In Claim 35 after "gold" insert --,--

Col. 16, Ln 11,
In Claim 40 after "gold" insert --,--

Signed and Sealed this

Fifth Day of February, 2008

JON W. DUDAS
*Director of the United States Patent and Trademark Office*